H. F. WEINLAND.
STRAINER.
APPLICATION FILED AUG. 11, 1909.

968,822.

Patented Aug. 30, 1910.
3 SHEETS—SHEET 2.

Witnesses

Inventor
Henry F. Weinland
By Percy Norton
Attorney

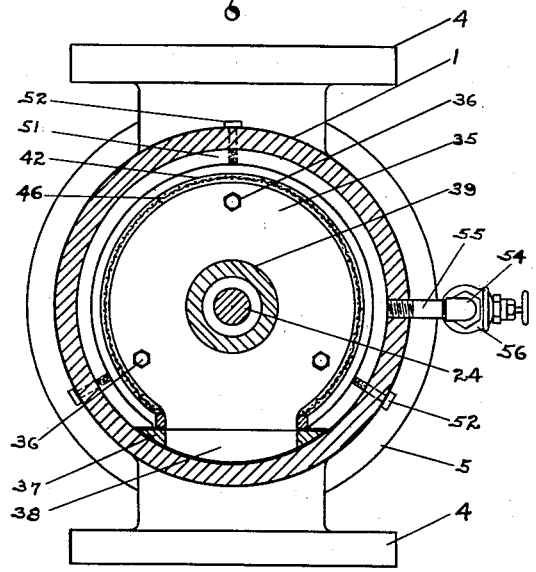
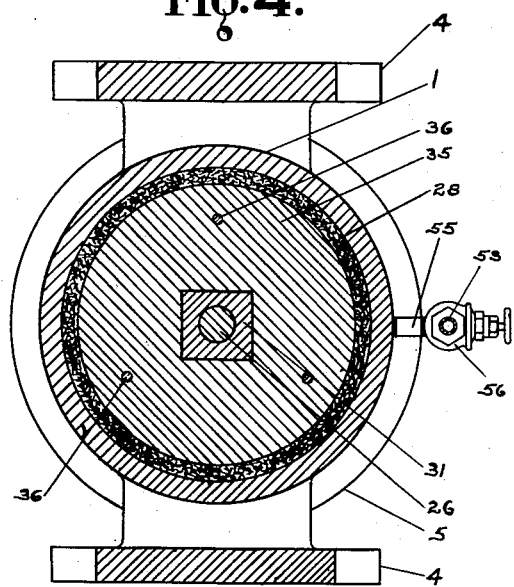
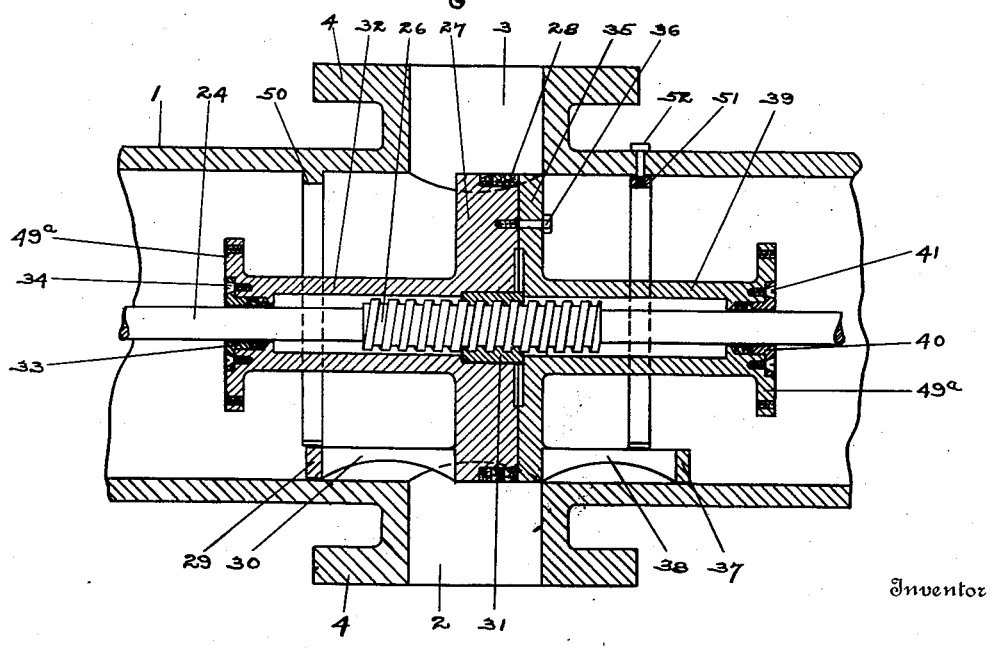

UNITED STATES PATENT OFFICE.

HENRY F. WEINLAND, OF SPRINGFIELD, OHIO, ASSIGNOR TO THE LAGONDA MANUFACTURING COMPANY, OF SPRINGFIELD, OHIO, A CORPORATION OF OHIO.

STRAINER.

968,822.  Specification of Letters Patent.  Patented Aug. 30, 1910.

Application filed August 11, 1909. Serial No. 512,441.

*To all whom it may concern:*

Be it known that I, HENRY F. WEINLAND, a citizen of the United States, residing at Springfield, in the county of Clark and State of Ohio, have invented certain new and useful Improvements in Strainers, of which the following is a specification, reference being had therein to the accompanying drawings.

My invention relates to strainers, and more particularly to strainers for removing the solid impurities from water or other fluid without interrupting the flow of the same.

The object of my invention is to provide a strainer of novel construction, simple, strong, compact and efficient, that can be easily operated to cut off the flow of the fluid from one strainer and direct it through another, and so arranged that the idle strainer can be quickly removed for cleaning.

With these and other objects in view, my invention consists of the constructions and combinations hereinafter described and set forth in the claims.

Figure 1:
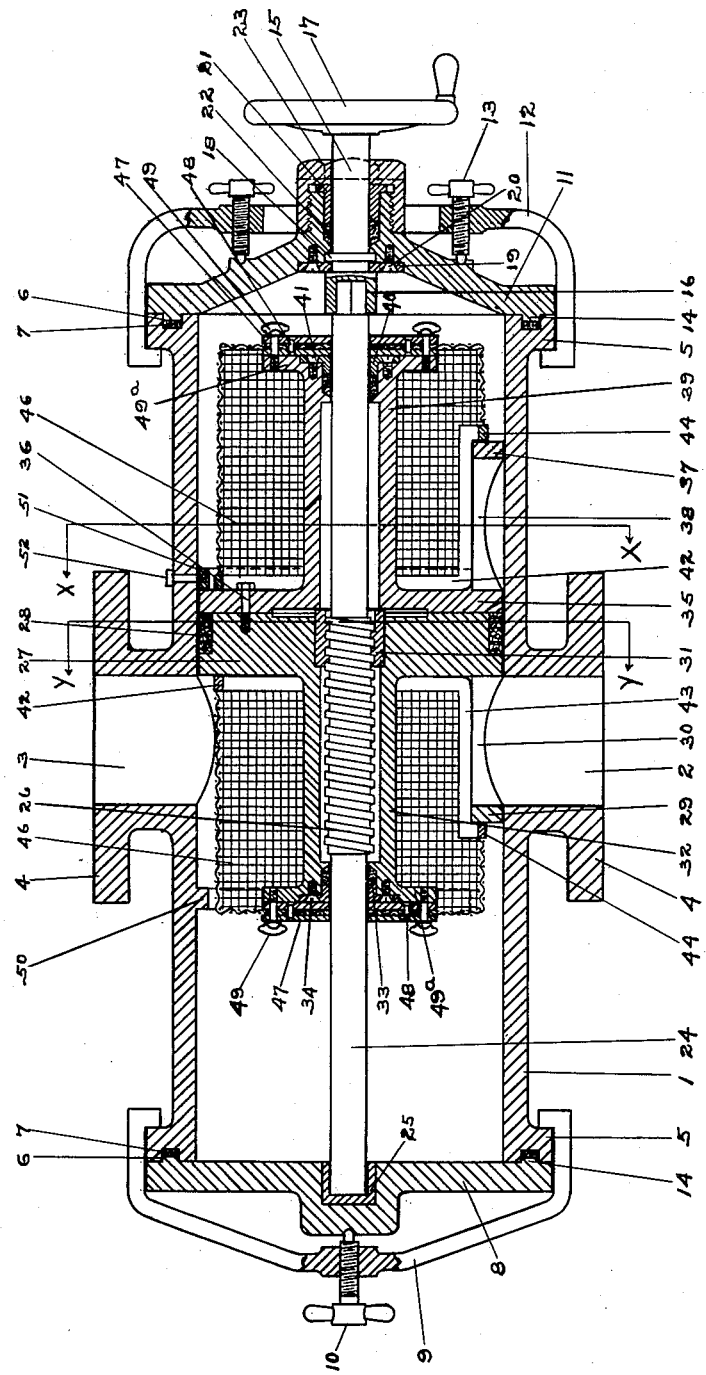
Figure 2:
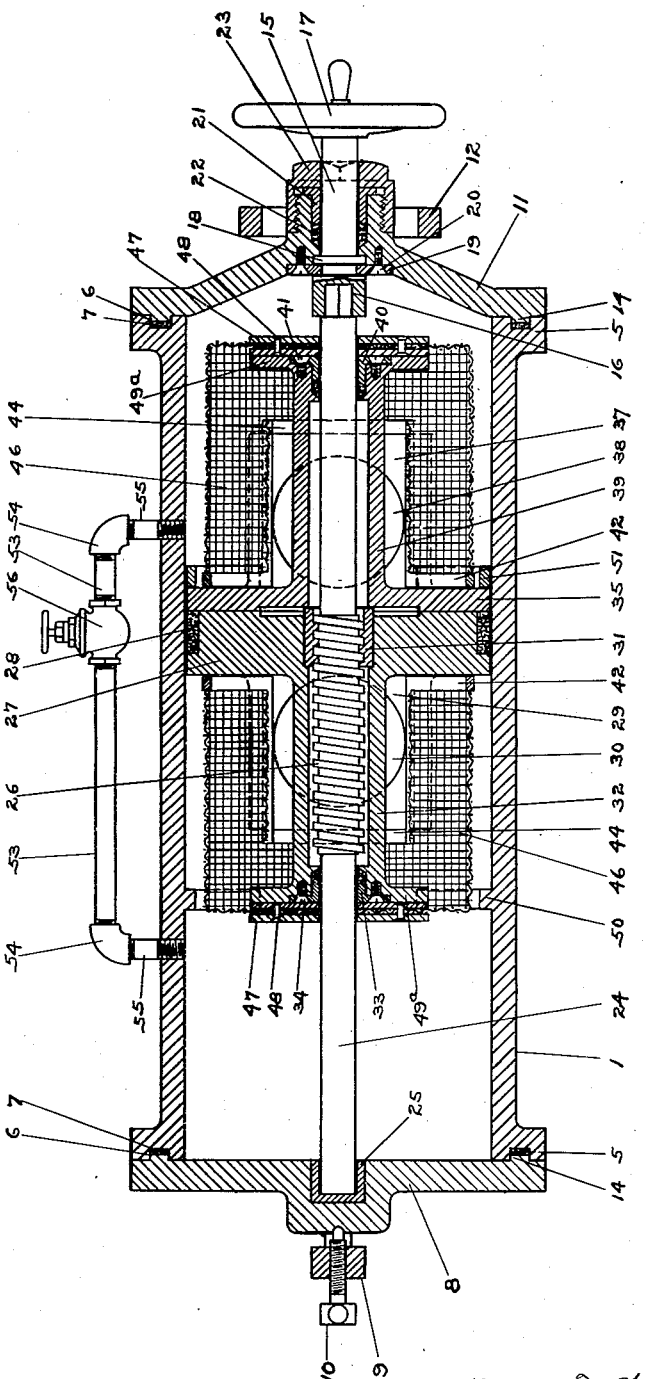

In the accompanying drawings, Figure 1 is a longitudinal section of a strainer embodying my invention. Fig. 2 is a like section at right angles to Fig. 1. Fig. 3 is a transverse section on the line $x-x$ of Fig. 1. Fig. 4 is a like section on the line $y-y$ of Fig. 1. Fig. 5 is a fragment of a longitudinal section showing the strainer carrying frame entering the guide stop at the left before it leaves the guide stop at the right, so the strainer cages are at all times prevented from turning.

Like numerals represent the same parts in the several views.

In the drawings a casing 1 has an inlet 2 and outlet 3, oppositely disposed to each other, provided with flanges 4 to attach the feed and discharge pipes; and the ends of said casing are provided with outwardly extending flanges 5 with annular recesses 6 having packing 7 therein.

A head 8 and a yoke 9 engaging the flange 5 at one end of said casing is provided with a hand set-screw 10 to tighten said head in place; and a head 11 and yoke 12 engaging the flange 5 at the opposite end of said casing is provided with hand set-screws 13 to tighten said head in place. The respective heads have annular projections 14, adapted to fit in the recesses 6 and press against the packing 7 in the ends of the casing to form a tight joint.

The head 11 is provided with a central hub having a shaft 15 journaled therein, said shaft being provided with a rectangular socket 16 at its inner end and having a hand-wheel 17 fixed to its outer end. A collar 18, fixed on said shaft, is held to bear at one side against a shoulder on said hub by a split plate 19 on the opposite side of said collar held in place by screws 20. A gland 21, packing 22 and a screw-cap 23, form a stuffing box for said shaft 15.

A shaft 24, provided with a rectangular end adapted to fit in the socket 16 of the shaft 15, and journaled at the other end in a box 25 set in a recess of the head 8, has a screw-threaded portion 26. A disk 27, fitted to move back and forth in said casing, is provided with packing rings 28 and has a segmental projection 29 extending from one side thereof, with a transverse opening 30, equal in cross-section to the inlet 2 and adapted to register therewith. A box 31, set in a rectangular recess in the disk 27, has a screw-threaded opening in which the screw-threaded portion 26 of the shaft 24 is adapted to turn to move said disk back and forth in the casing; and a cylinder 32 projecting from one side of the disk 27, through which the screw-threaded portion 26 of the shaft 24 extends, is provided at its outer end with a stuffing box gland 33, held in place by set-screws 34. A disk 35, secured to the disk 27 by bolts 36, and forming a part thereof, has a segmental projection 37, extending from one side thereof, with a transverse opening 38, equal in cross-section with the inlet 2 and adapted to register therewith; and a cylinder 39 projecting from one side of the disk 35, through which the shaft 34 extends, is provided with a stuffing box gland 40 held in place by set-screws 41. The cylinders 32 and 39, with the stuffing boxes at their outer ends, form a chamber in which the screw-threaded portion of the shaft operates free of the water or fluid.

Perforated strainers 46, which I have shown formed of wire screen, are secured to frames or guards 42 and to projections 43 of said guards, said guards and projections resting against the disks 27 and 35 and the projections 29 and 37, and having shoulders 44 abutting the outer ends of the projections 29 and 37; and said strainers are further secured by plates 47, engaging opposite sides of the outer ends of said strainers and held together by rivets 48; and bolts 49 extending through perforations in said plates and screw-threaded into perforations in flanges 49ª projecting from cylinders 32 and 39, hold said strainers in place. Said bolts are provided with handles as shown, so that they may be readily unscrewed for the quick release and removal of the strainers.

A projection 50 extending around the interior surface of the casing and terminating over the segmental projection 29 that carries one of the strainers, and a removable projection 51, secured by bolts 52, also extending around the interior of the casing and terminating over the projection 37 that carries the other strainer, form guides for and prevent the disks 27 and 35, with their projections and cages, from turning in the casing; and form stops to limit the longitudinal movement of said parts. The guide stop 51 is made removable so that the disks, strainers and supports for same can be assembled on the shaft and inserted in the casing, and all of said parts can be easily taken out by removing said removable guide-stop.

It will be seen that by turning the hand-wheel 17, the socket end 16 of the shaft 15 engaging the rectangular end of the shaft 24, will turn the screw-threaded portion of said shaft in the screw-threaded box 31, and the disks 27 and 35, together with the strainer carrying parts, will be moved so that the water or fluid to be strained can be directed through either one of the strainers while the other is cut off; and by removing the head on the end of the casing in which the idle strainer is located, it can be removed and cleaned, it being only necessary to remove the bolts 49 to take the strainers out of the casing.

A pipe 53, having elbows 54, with pipes 55 screw-threaded into the casing and opening into said casing on opposite sides of the disks 27, has a valve 56, the opening of which will equalize the pressure on opposite sides of said disks to permit of the easy operation of the shaft to move the disk and strainers.

Having thus described my invention, I claim:

1. The combination of a casing having oppositely disposed open ends with separate removable closures therefor rigidly secured to the respective ends, said casing further having an inlet and outlet, a disk, strainers on each side thereof removable through said open ends and means to move said disk and strainers to cut off one of said strainers and direct the flow of fluid through the other strainer, substantially as described.

2. The combination of a casing having oppositely disposed open ends with separate removable closures therefor rigidly secured to the respective ends, said casing further having an inlet and outlet, a disk in said casing, strainers on opposite sides thereof removable through said open ends and a hand device carried by one of said closures and having a screw-threaded connection adapted to move said disk and strainers to cut off one of said strainers and direct the flow of fluid through the other, substantially as described.

3. The combination of a casing having an inlet and outlet, a disk, a shaft, a plurality of strainers removable through openings in said casing, closures for said openings, one of said closures carrying devices removable therewith adapted to engage said shaft and move said disk and strainers to cut off either one of said strainers and direct the flow of fluid through the other, substantially as described.

4. The combination of a casing having an inlet and outlet, a disk, strainers on opposite sides of said disk removable through openings in said casing, closures for said openings, means to move said disk and strainers longitudinally in said casing, projections on said casing to limit the longitudinal movement of said disk and strainers, and further adapted to keep the same from turning, one of said projections being removably secured to said casing, substantially as described.

5. The combination of a casing having an inlet and outlet, a disk, strainers on opposite sides thereof removable through openings in said casing, closures for said openings, a shaft having screw-threads thereon adapted to engage a screw-threaded opening in said disk, and means to prevent the fluid passing through the strainer from coming in contact with the screw-threaded portion of the shaft, substantially as described.

6. The combination of a casing having an inlet and outlet, a disk having a screw-threaded opening therethrough, and central oppositely disposed cylindrical projections, a shaft having screw-threads thereon, extending through said cylindrical projections and engaging the screw-threaded opening in the disk, stuffing boxes for said shaft on the outer ends of said cylindrical projections, strainers removable through openings in said casing, closures for said openings, means to turn said shaft and move said disk and strainers to cut off one of said strainers and direct the flow of fluid through the other strainer, substantially as described.

7. The combination of a casing having an inlet and outlet, a disk in said casing, strainers removable through openings in said casing, closures for said openings, means to move said disk and strainers to cut off either one of said strainers and direct the flow of fluid through the other, and means to equalize the pressure on opposite sides of said disk, substantially as described.

8. The combination of a casing having an inlet and outlet, a separable disk in said casing having oppositely-extending segmental projections with openings therethrough adapted to register with said inlet, strainers removably secured on said disk and projections, openings through the casing for the removal of said strainers, closures for said openings, and means to move said disk with its projections and strainers to cut off one of said strainers and direct the flow of fluid through the other, substantially as described.

In testimony whereof, I have hereunto affixed my signature in the presence of two witnesses.

HENRY F. WEINLAND.

Witnesses:
GROVER ILGEN,
CARL CASKEY.